United States Patent
Jalloul et al.

(10) Patent No.: US 9,294,259 B2
(45) Date of Patent: Mar. 22, 2016

(54) FULL DUPLEX SYSTEM IN MASSIVE MIMO

(71) Applicant: Broadcom Corporation, Irvine, CA (US)

(72) Inventors: Louay Jalloul, San Jose, CA (US); Amin Mobasher, Menlo Park, CA (US); Sam Alex, Sunnyvale, CA (US)

(73) Assignee: Broadcom Corporation, Irvine, CA (US)

( * ) Notice: Subject to any disclaimer, the term of this patent is extended or adjusted under 35 U.S.C. 154(b) by 51 days.

(21) Appl. No.: 14/042,107

(22) Filed: Sep. 30, 2013

(65) Prior Publication Data

US 2015/0092621 A1    Apr. 2, 2015

(51) Int. Cl.
*H04L 5/14*    (2006.01)
*H04B 7/06*    (2006.01)
*H04B 7/10*    (2006.01)

(52) U.S. Cl.
CPC ............ *H04L 5/1461* (2013.01); *H04B 7/0617* (2013.01); *H04B 7/10* (2013.01); *H04L 5/143* (2013.01)

(58) Field of Classification Search
CPC ...... H04B 7/0617; H04B 7/086; H04B 7/043; H04B 7/0874; H04J 11/0033
See application file for complete search history.

(56) References Cited

U.S. PATENT DOCUMENTS

| | | | | |
|---|---|---|---|---|
| 8,737,498 | B2 * | 5/2014 | Park et al. | 375/260 |
| 8,923,772 | B2 * | 12/2014 | Yu et al. | 455/63.4 |
| 8,929,550 | B2 * | 1/2015 | Shattil et al. | 380/270 |
| 8,942,302 | B2 * | 1/2015 | Krishnamurthy et al. | 375/260 |
| 2011/0201357 | A1 | 8/2011 | Garrett et al. | |

* cited by examiner

*Primary Examiner* — Chandrahas Patel
(74) *Attorney, Agent, or Firm* — Sterne, Kessler, Goldstein & Fox P.L.L.C.

(57) ABSTRACT

A multiple input multiple output (MIMO) antenna system is implemented for communications in a wireless device. MIMO beamforming techniques are utilized to improve communications, and may be utilized in full-duplex mode. Techniques include the formation of beamforming patterns having orthogonal polarizations to one another at each communication device, but having matching polarization between transmit/receive pairs located at each respective communication device. Techniques also include the formation of beamforming patterns in a direction towards another communication device to maximize transmit power in that direction while inducing nulls in the beamforming pattern to reduce self-interference coupling via antennas configured for reception. Full-duplex communications are improved through monitoring of the self-interference coupling and adapting the beamforming patterns to reduce it. Beamforming vectors may be generated by solving a cost function that may include an additional constraint of reduction of self-interference coupling.

26 Claims, 4 Drawing Sheets

FULL DUPLEX SYSTEM IN MASSIVE MIMO

FIELD OF DISCLOSURE

The present disclosure relates generally to multiple-input multiple-output (MIMO) communication systems and more specifically to the utilization of various beamforming techniques within a MIMO communication system with a large number of antennas to enable full-duplex wireless communication system performance.

BACKGROUND

MIMO systems are often used to improve wireless communication performance between one or more devices. In a MIMO communication system, a first communication device, such as a user equipment (UE) may have more than one antenna (e.g., 2, 4, 8, etc.) for communicating with a second communication device, such as a base station. The second communication device may also be equipped with more than one antenna. The first and the second communication devices may utilize several of their respective antennas simultaneously to facilitate MIMO communications. In massive MIMO (M-MIMO), the first and/or second communication device has a large number of antennas (e.g., 100).

Full-duplex communications between the two communication devices includes concurrent communications from the first communication device to the second communication device, and vice-versa. To enhance operating bandwidth during full-duplex communications, each transmitter and receiver may use the same, or overlapping frequency bands, while involved in such active communications. As a result, a communication device may couple its own transmitted signals while attempting to receive communications from the other device. This self-coupling may result in decreased communication performance.

BRIEF DESCRIPTION OF THE DRAWINGS/FIGURES

Figure 1:
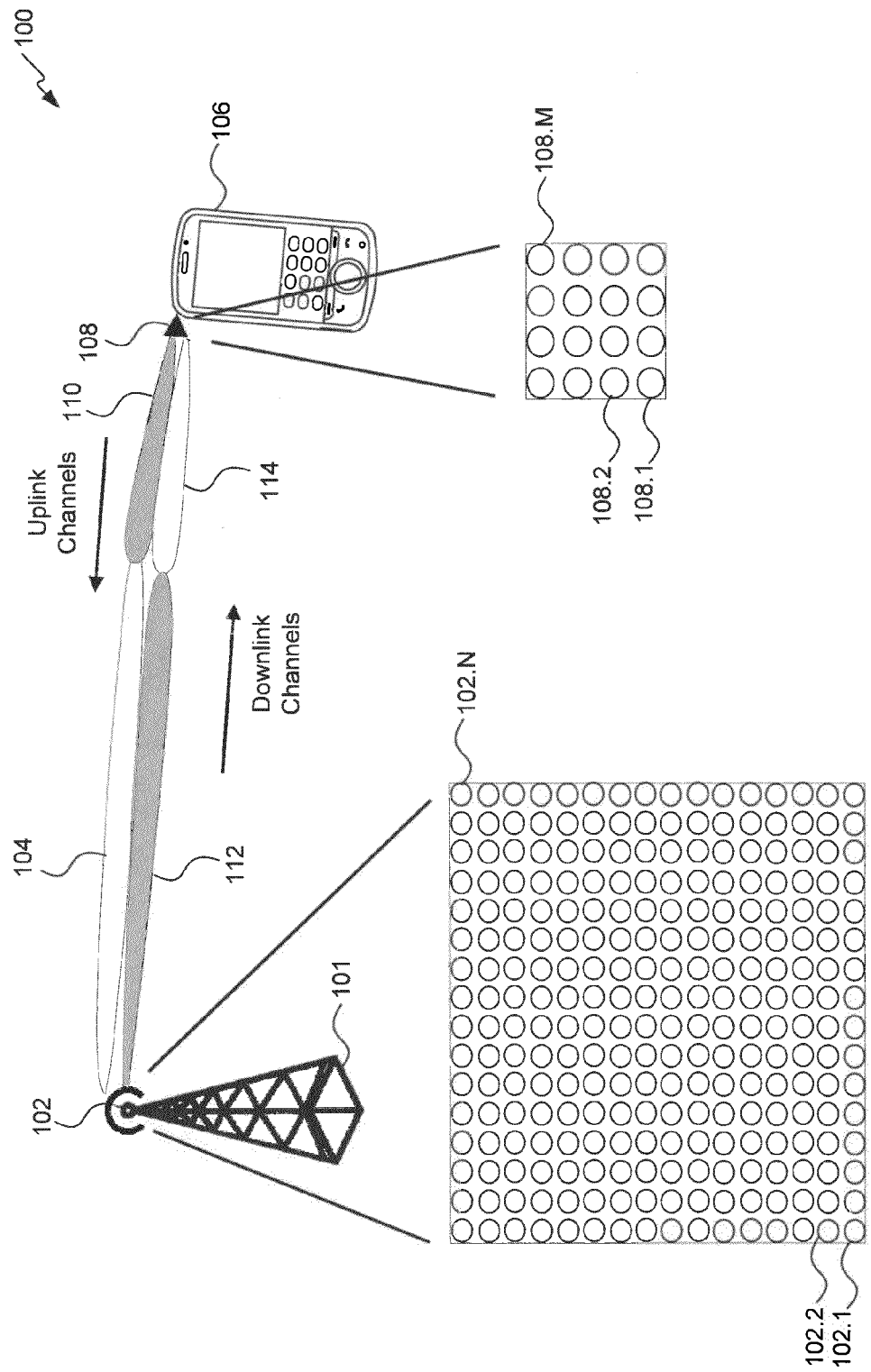
FIG. 1 illustrates a MIMO communications system according to an exemplary embodiment of the disclosure.

The disclosure will now be described with reference to the accompanying drawings. In the drawings, like reference numbers generally indicate identical, functionally similar, and/or structurally similar elements. The drawing in which an element first appears is indicated by the leftmost digit(s) in the reference number.

DETAILED DESCRIPTION OF THE DISCLOSURE

The following Detailed Description refers to accompanying drawings to illustrate exemplary embodiments consistent with the disclosure. References in the Detailed Description to "one exemplary embodiment," "an exemplary embodiment," "an example exemplary embodiment," etc., indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

FIG. 1 illustrates a MIMO communications system 100 according to an exemplary embodiment of the disclosure. MIMO communications system 100 includes communication devices 101 and 106, which communicate with one another via uplink and downlink channels.

In an exemplary embodiment of the present disclosure, communication device 106 is a user equipment (UE), such as a smartphone, a tablet, or other mobile device, for example. In accordance with such an embodiment, communication device 101 is a base station. Communication devices 101 and 106 may be implemented within any type of wireless communications system. For example, communication devices 101 and 106 may communicate over a cellular network implementing a cellular protocol. The cellular protocol may be the 3GPP Long-Term Evolution (LTE) protocol, and in accordance with such an embodiment, communication device 101 is an Evolved Node B (eNB).

Each of communication devices 101 and 106 include a respective MIMO antenna 102 and 108. MIMO antennas 102 and 108, in turn, each include a number of antenna elements. For example, MIMO antenna 102 includes N antenna elements 102.1-102.N, and MIMO antenna 108 includes M antenna elements 108.1-108.M, where N and M are any integer numbers. N and M may be equal or different, including N being greater than M, and vice-versa.

Communication devices 101 and 106 utilize any number of their respective antenna elements 102.1-102.N and 108.1-108.M to generate beamforming patterns for carrying transmitted and/or received signals. As will be appreciated by those of ordinary skill in the art, various combinations of antenna element shapes having any number of amplitude and phase distributions result in corresponding beamforming patterns having various antenna gains and directions. For example, communication devices 101 and 106 may utilize a greater number of antenna elements 102.1-102.N and/or 108.1-108.M to facilitate higher gain, "pencil-beam" type patterns.

Communications between communication devices 101 and 106 occurs in two different directions. In an embodiment in which communication device 101 is a base station and communication device 106 is a UE, the uplink direction is associated with communications that are transmitted from the UE and received by the base station. In accordance with such an embodiment, the downlink direction is associated with communications that are transmitted from the base station and received by the UE.

Communication devices 101 and 106 may utilize any number of beamforming patterns to communicate with one another. As illustrated in FIG. 1, beamforming patterns 104 and 110 are associated with uplink communications between communication devices 101 and 106. Beamforming pattern 104 corresponds to a receive beamforming pattern used by communication device 101, while beamforming pattern 110 corresponds to a transmit beamforming pattern used by communication device 106.

Beamforming patterns 112 and 114 are associated with downlink communications between communication devices 101 and 106. Beamforming pattern 114 corresponds to a receive beamforming pattern used by communication device 106, while beamforming pattern 112 corresponds to a transmit beamforming pattern used by communication device 101. Although FIG. 1 illustrates separate beamforming patterns used for uplink and downlink communications, MIMO communications system 100 may use the same beamforming patterns for both uplink and downlink communications. In other words, in accordance with such an embodiment, only one pair of beamforming patterns 104/110 or 112/114 is used for both uplink and downlink communications, such as in a half-duplexing embodiment, for example.

Communication devices 101 and 106 may communicate with one another utilizing any duplexing mode. In an embodiment whereby communication devices 101 and 106 communicate in full-duplex mode, it is advantageous to utilize separate beamforming patterns to facilitate processing of multiple data streams through concurrent uplink and downlink channels.

In accordance with a full-duplexing embodiment, beamforming pattern 110 carries signals transmitted from communication device 106, while beamforming pattern 114 is used to receive signals transmitted from communication device 101. Signals transmitted via beamforming pattern 110 will generally have higher power levels than signals received via beamforming pattern 114 due to path loss. This also holds true for the transmission and reception of signals at communication device 101. Therefore, when full-duplexing mode is used for communications, communication devices 101 and/or 106 risk coupling their own transmissions back into themselves. This "self-interference coupling" may act to degrade communication performance as a result of overpowering receivers at each respective communication device with undesired transmissions.

To address these issues, embodiments of the present disclosure utilize beamforming and/or polarization control techniques. Due to the large number of antennas 102.1-102.N and/or 108.1-108.M, any of beamforming patterns 104, 108, 112, and/or 114 may be high gain pencil beam type patterns. When a pair of beamforming patterns 104/112 and/or 110/114 are high gain patterns, this helps decouple the uplink and downlink paths from one another at the respective device, which reduces self-interference coupling. In accordance with an exemplary embodiment of the present disclosure, beamforming patterns 104 and 110 are generated to have substantially matching polarizations. In accordance with such an embodiment, beamforming patterns 112 and 114 are likewise generated to have substantially matching polarizations. However, the polarization of beamforming patterns 104 and 110 is substantially orthogonal to the polarization of beamforming patterns 112 and 114. For example, beamforming patterns 104 and 110 may be horizontally polarized, while beamforming patterns 112 and 114 are vertically polarized. Since antenna elements configured to generate a beamforming pattern of a particular polarization reject electromagnetic fields of orthogonal polarization, self-interference coupling is reduced through such an embodiment.

Although cross-polarization techniques alone help reduce self-interference coupling, such techniques do not account for extraneous factors that may result in changes to the polarizations of the beamforming patterns after they are generated. For example, polarizations may be altered due to coupling from other objects. For example, a particular polarization of a beamforming pattern may change once the communication device is placed next to a user's head to make a phone call.

Therefore, in accordance with an embodiment of the present disclosure, any of beamforming patterns 104, 110, 112, and 114 may be dynamically changed based on one or more communication metrics. These communication metrics may be related to the communications environment, self-interference coupling, interference generated by another source other than communication devices 101 or 106, and/or signal power received at either of the communication devices 101 or 106, for example. In this way, the communication metrics may be used as a type of communications channel feedback, allowing for the adjustment of beamforming patterns in response to the communication metrics. Such an embodiment may be utilized separately from, or in conjunction with, cross-polarization techniques. For example, communication devices 101 and/or 106 may initially generate their respective beamforming patterns 104, 110, 112, and 114 having orthogonal polarizations at each respective device. If propagation through the communications environment alters these polarizations to render the beamforming patterns non-orthogonal to one another, then communication devices 101 and/or 106 may utilize adaptive beamforming based on the communications metrics to re-introduce orthogonality between the respective beamforming patterns.

In accordance with an embodiment of the present disclosure, the communication metrics are utilized by communication device 101 and/or 106 to generate beamforming patterns 104, 110, 112, and/or 114 having advantageous geometric properties. More specifically, beamforming patterns 110 and/or 112 may be generated to have a main beam directed towards the other communication device for signal transmissions. Beamforming patterns 110 and/or 112 may also be generated to have one or more nulls in the direction of the antenna elements associated with beamforming patterns 114 and/or 104.

For example, communication device 106 may generate beamforming pattern 110 directed towards MIMO antenna 102. Beamforming pattern 110 may also be shaped to include nulls towards those antenna elements from among antenna elements 108.1-108.M that are receiving signals from communication device 101 via beamforming pattern 114. These nulls help reduce coupling of the transmitted signals back into communication device 106. Beamforming patterns 104 and/or 114 may also be shaped to avoid undesired coupling from other sources of interference. In this way, the shapes of beamforming patterns are exploited to allow for proximity between antennas generating concurrent uplink and downlink beamforming patterns while improving communication performance in full-duplex communications mode.

Embodiments of the present disclosure may utilize any combination of polarization and/or beamforming techniques between communication devices 101 and 106. For example, communication device 101 may utilize only cross-polarization techniques, while communication device 106 may utilize cross-polarization techniques in combination with the monitoring of communication signal metrics and dynamic beamforming techniques to further improve communication performance.

Figure 2:
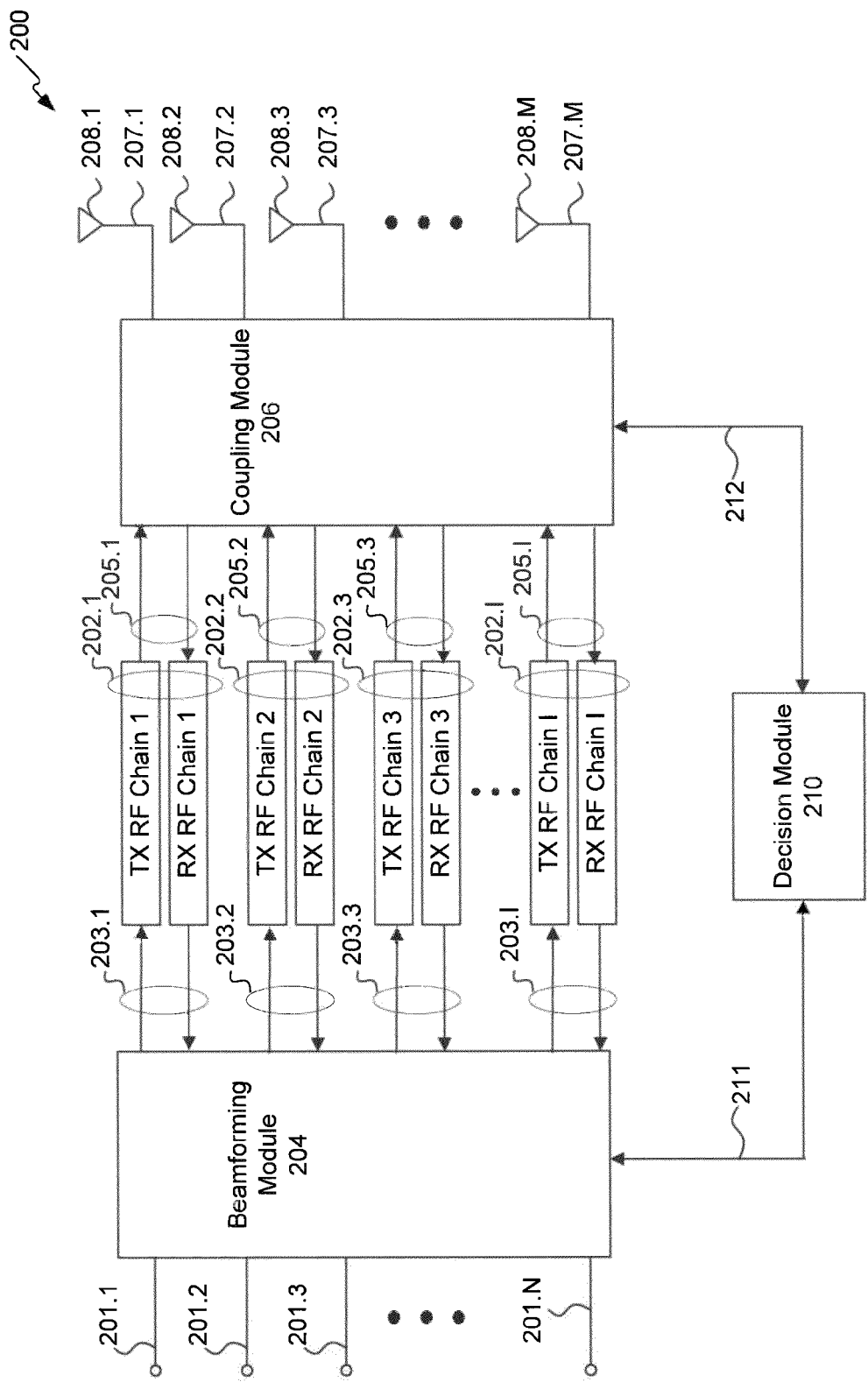
FIG. 2 illustrates a MIMO beamforming system according to an exemplary embodiment of the disclosure.

FIG. 2 illustrates a MIMO beamforming system 200 according to an exemplary embodiment of the disclosure. MIMO beamforming system 200 includes I RF chains 202.1-202.I, a beamforming module 204, a coupling module 206, M antennas 208.1-208.M, and a decision module 210.

Although separate integer designations 'N,' 'M,' and 'I' are used in FIG. 2 to illustrate the number of corresponding ports and elements of MIMO beamforming system 200, these numbers may be the same or different from one another. In an exemplary embodiment of the present disclosure, the number of RF chains 202.1-202.I is equal to a number of ports 201.1-201.N and antennas 208.1-208.M, respectively.

MIMO beamforming system 200 may be implemented within any communication device. RF chains 202.1-202.I are configured to facilitate communications between one or more communication devices. In accordance with an embodiment of the present disclosure, MIMO beamforming system 200 is implemented within communication device 101 and/or communication device 106.

RF chains 202.1-202.I are configured to handle transmit and receive operations between a device in which MIMO beamforming system 200 is implemented, and another communication device, such as communication devices 101 and/or 106, for example. RF chains 202.1-202.I each includes a transmit TX RF chain and an RX receive RF chain. RF chains 202.1-202.I interface to a processor (e.g., a baseband processor) via beamforming module 204 and corresponding ports 201.1-201.N. Ports 201.1-201.N may be implemented with any number of wired buses and/or transmission lines, for example. The processor is not shown in FIG. 2, but may provide signals and/or data to be modulated and transmitted via RF chains 202.1-202.I via each of the respective ports 201.1-201.N. Similarly, RF chains 202.1-202.I may also provide demodulated data to the processor for further processing via ports 201.1-201.N.

Each of RF chains 202.1-202.I is also coupled to beamforming module 204 via corresponding RF ports 203.1-203.I. Each of corresponding RF ports 203.1-203.I, in turn, includes a transmit port TX and a receive port RX. As will be appreciated by one of ordinary skill in the art, each of the RF chains 202.1-202.I may be implemented with any number of power amplifiers, modulators, mixers, drivers, demodulators, processors, frequency synthesizers, phase-locked loops (PLLs), and/or switches to provide for any level of communications processing. Each of RF chains 202.1-202.I may be configured to operate concurrently in both transmit and receive modes of operation. That is, each TX and RX chain from RF chains 202.1-202.I may be configured to transmit and receive at the same time while coupled to any combination of antennas 208.1-208.M. Each of TX RF chains 202.1-202.I is configured to send a pilot signal on its respective TX port of its respective RF port 205.1-205.I. The pilot signal may be, for example, an RF signal generated at a single amplitude and frequency.

MIMO beamforming system 200 may be implemented as a part of any type of MIMO system or as a combination of systems. As will be appreciated by those of ordinary skill in the art, each of RF chains 202.1-202.I may be configured based on the type of MIMO system in which they are implemented. For example, each of RF chains 202.1-202.I may operate at any frequency and/or band of frequencies, which may be the same or different from one another. In an exemplary embodiment of the present disclosure, each of RF chains 202.1-202.I operates at the same frequency, or band of frequencies, as one another. Furthermore, RF chains 202.1-202.I may carry the same data stream or different data streams. For example, for implementation of a precoding MIMO system, each of RF chains 202.1-202.I may transmit and/or receive the same signals. To provide another example, in a spatial multiplexing system, each of the RF chains 202.1-202.I may transmit and/or receive a lower rate stream which, together with other lower rate streams forms a higher rate stream. To provide a further example, in a diversity coding system, each of RF chains 202.1-202.I may transmit and/or receive a single data stream that is space-time coded such that the transmitted and/or received signals utilize orthogonal encoding.

Beamforming module 204 is configured to communicate with decision module 210 via decision module port 211. Beamforming module 204 is, configured to couple any number of RF ports 201.1-201.N to corresponding RF chains 202.1-202.I in response to communications received from decision module 210 via decision module port 211. In an exemplary embodiment of the present disclosure, beamforming module 204 is configured to combine any number of signals from ports 201.1-201.N and to provide the combination of signals as a weighted sum to any number of TX RF chains from RF chains 202.1-202.I. In accordance with an embodiment of the present disclosure, beamforming module 204 is configured to separate signals received from any number of RX RF chains from RF chains 202.1-202.I and provide the separated signals to RF ports 201.1-201.N.

Beamforming module 204 is configured to apply a beamforming matrix received from decision module 210. In accordance with an exemplary embodiment of the present disclosure, beamforming module 204 is part of a baseband processor. In accordance with such an embodiment, beamforming module 204 may utilize precoding in the baseband to implement application of the beamforming matrix to signals transmitted and received by MIMO beamforming system 200. The beamforming matrix may include any number of transmit and/or receive beamforming vectors corresponding to transmitted and/or received data streams.

In an exemplary embodiment of the present disclosure, each transmit beamforming vector is applied to signals constituting each data stream being transmitted using the TX ports of RF ports 203.1-203.I. In a further embodiment of the present disclosure, each receive beamforming vector is applied to signals constituting each data stream received using the RX ports of RF ports 205.1-205.I. The transmit and/or receive beamforming vectors include a beamforming weight for each transmitted and/or received signal of each RF chain 202.1-202.I. This allows beamforming module 204 to generate the corresponding uplink and downlink beamforming patterns by applying the respective beamforming weights to signals transmitted and received via the uplink and downlink channels, respectively.

Beamforming module 204 may be implemented with any number of processing modules that may have any number of functions. Although illustrated in FIG. 2 as a single block, beamforming module 204 may be implemented with several, beamforming modules that each apply a different portion of the beamforming matrix to transmitted and received signals. For example, beamforming module 204 may include a transmit and a receive beamforming module, each applying a part of the beamforming matrix associated with the uplink and downlink beamforming patterns to transmitted and received signals, respectively.

Ports 201.1-201.N may carry any number of concurrent data streams. In accordance with an embodiment of the present disclosure, the number N of ports 201.1.-201.N, the number I of RE ports 203.1-203.I, RF chains 202.1-202J, RF ports 205.1-205.I, and the number M of antennas 208.1-208.M are all equal to one another. In accordance with such an embodiment, a single data stream transmit and receive beamforming matrix applied by beamforming module 204 includes a number of identical columns equal to the numbers M, N, and I (which are the same number in such an embodiment). Such a beamforming matrix is equivalent to a single beamforming vector. Therefore, in accordance with such an embodiment, the beamforming matrix includes a single transmit beamforming vector and a single receive beamforming vector.

The beamforming matrix may include, for example, an amplitude and phase distribution corresponding to the signals transmitted and received via the respective coupled antennas. As will be appreciated by those of ordinary skill in the art, beamforming module 204 may include any number of scalers, amplifiers, attenuators, phase shifters, and/or phase delay modules to facilitate application of the beamforming matrix.

Coupling module 206 is coupled to RE chains 202.1-202.I via RF ports 205.1-205.I, and to antennas 208.1-208.M via RF ports 207.1-207.M. Coupling module 206 is coupled to decision module 210 via decision module port 212. Coupling module 206 is configured to couple any of RF chains 202.1-202.I to any of antennas 208.1-208.M by coupling RX/TX lines from any of RF ports 205.1-205.I to respective RF ports 207.1-207.M. In accordance with an exemplary embodiment of the present disclosure, coupling module 206 is configured to couple each of the corresponding TX and RX lines from each of respective RF ports 205.1-205.I to the same corresponding antenna from among antennas 208.1-208M. For example, coupling module 206 may couple both RX and TX lines of RF port 205.1 to antenna 208.1 via RF port 207.1.

As will be appreciated by those of ordinary skill in the art, each of coupling module 206 may include any number of impedance matching devices, filters, couplers, splitters, combiners, circulators, and/or duplexers to allow each of antennas 208.1-208.M to be utilized for full-duplex communications. That is, coupling module 206 allows the antenna to which it is coupled to support concurrent transmission and reception via its respective TX and RX ports. Although coupling module is illustrated as a single block in FIG. 2, coupling module 206 may be implemented with any number of individual coupling modules. Coupling module 206 may couple any number of RF ports 205.1-205.I to any number of RF ports 207.1-207.M with any number of coupling modules. For example, coupling module 206 may include I coupling modules, one corresponding to each of RF chains 202.1-202.I.

Coupling module 206 is configured to communicate with decision module 210. Coupling module 206 may utilize the beamforming matrix calculated by decision module 210 to determine which antennas from among antennas 208.1-208.M to couple to corresponding RF chains 202.1-202.I. The corresponding mapping between RF chains 202.1-202.I and antennas 208.1-208.M results in antenna clustering. In an exemplary embodiment of the present disclosure, the beamforming vectors that constitute the beamforming matrix include weighting coefficients to be applied to transmitted and received data streams by beamforming module 204, which are then coupled to coupling module 206 via RF ports 205.1-205.I. In accordance with such an embodiment, coupling module 206 does not route RF ports from among RF ports 205.1-205.I that corresponding to zero coefficient weighting values to antennas 208.1-208.M.

In accordance with an exemplary embodiment of the present disclosure, coupling module 206 may couple RF chains 205.1-205.I to separate antennas from among antennas 208.1-208.M for transmission and reception. In accordance with such an embodiment, separate transmit and receive antenna clusters are formed that include first and second subsets, respectively, of antennas from among antennas 208.1-208.M. A beamforming vector in accordance with such an embodiment may have non-zero value weighting coefficients corresponding to TX RF chains from among 202.1-202.I and zero value weighting coefficients corresponding to the same RX RF chains from among 202.1-202.I associated with the non-zero TX chain. In the receive direction, a beamforming vector may have non-zero value weighting coefficients corresponding to RX RF chains from among 202.1-202.I and zero value weighting coefficients corresponding to the same TX RF chains from among 202.1-202.I associated with the non-zero RX chain.

For example, in accordance with an embodiment whereby separate transmit and receive antenna clusters are utilized, a transmit beamforming vector may have a non-zero value weighting coefficient corresponding to the signal transmitted via TX RF chain 1, but a zero value weighting coefficient corresponding to the signal received via RX RF chain 1. Further in accordance with such an example, a receive beamforming vector may have a non-zero value weighting coefficient corresponding to the signal received via RX RF chain 2, but a zero value weighting coefficient corresponding to the signal transmitted via TX RF chain 2.

Any number of antennas 208.1-208.M may be utilized for communications between the device in which MIMO beamforming system 200 is implemented and another communication device, such as communication devices 101 and/or 106, for example. A first subset of antennas 208.1-208.M is utilized for uplink communications and correspond to a first beamforming pattern, such as beamforming patterns 110 and/or 112, for example. A second subset of the antennas 208.1-208.M is utilized for downlink communications and correspond to a second beamforming pattern, such as beamforming patterns 104 and/or 114, for example. These first and second antenna subsets may be mutually exclusive, or may include shared antenna elements from among antennas 208.1-208.M. The first and second antenna subsets may include identical antennas.

Antennas 208.1-208.M may be implemented as any type of antenna capable of facilitating communications between the device in which MIMO beamforming system 200 is implemented and another communication device, such as communication devices 101 and/or 106, for example. Although illustrated as single antenna elements, each of the antennas 208.1-208.M may be implemented as any number or combination of single and/or multi-band antenna elements. Antennas 208.1-208.M may be implemented, for example, using printed and/or patch antenna elements.

Decision module 210 is coupled to beamforming module 204 via decision module port 211 and to coupling module 206 via decision module port 212. Decision module 210 may be implemented as a processor, for example. Decision module 210 may be implemented within any of the components shown in FIG. 2. For example, decision module 210 may be integrated as a part of beamforming module 204 and/or coupling module 206. To provide another example, decision module 210 may be implemented as part of another processor, such as a baseband processor that is coupled to RF chains 202.1-202.I via ports 201.1-201.N. Again, the baseband processor is not shown in FIG. 2. Decision module 210 may be implemented with any number of processors and/or processing modules.

Decision module 210 is configured to sample signals transmitted and received via coupling module 206. Decision module 210 is configured to utilize these sampled signals to calculate communication performance metrics in the analog and/or the digital domain. The communication performance metrics may include information related to the quality of signals utilized for communications between MIMO beamforming system 200 and another communication device, such as bit error rate (BER), received signal strength indication (RSSI), signal-to-noise ratio (SNR), and/or signal-to-noise-plus-interference ratio (SINR), for example. The communication signal performance metrics may also include channel state information, detected information related to the presence of additional sources of interference (such as other nearby base stations that are transmitting signals) and/or self-interference coupling information. Decision module 210 is configured to process the communication performance metrics and to determine one or more beamforming vectors which constitute the beamforming matrix.

Decision module 210 is configured to control the couplings between RF ports 205.1-205.1 and antennas 208.1-208.M by controlling coupling module 206 via decision module port 212. Decision module 210 communicates the calculated beamforming matrix, which includes one or more beamforming vectors, to coupling module 206. By controlling coupling module 206, various antenna clusters may be selected by coupling module 206 in accordance with the calculated beamforming matrix.

Decision module 210 is configured to control the beamforming weights applied by beamforming module 204 by controlling beamforming module 204 via decision module port 211. Decision module 210 communicates the beamforming matrix, which includes one or more beamforming vectors, to beamforming module 204. By controlling beamforming module 204, various beamforming patterns may be generated by beamforming module 204 in accordance with the calculated beamforming matrix, and transmitted and received via their respective coupled antenna clusters.

In an exemplary embodiment of the present disclosure, decision module 210 utilizes one of several calculated communication performance metrics as a feedback mechanism to adjust the uplink and/or downlink beamforming vectors, thus dynamically changing the uplink and/or downlink beamforming patterns. The communication performance metrics May include Channel information indicative of one or more beamforming vectors being utilized at another communication device that is in communications with the device in which MIMO beamforming system 200 is implemented, such as communication devices 101 and/or 106, for example.

Decision module 210 is configured to sample the pilot signal via decision module port 212. Decision module 210 may measure a power level of the pilot signal as it is coupled back through coupling Module 206. The power level of the received pilot signal is an indication of the self-interference coupling factor. In this way, the self-interference coupling factor acts as a calibration tool to test the self-interference performance of a particular beamforming configuration.

Knowledge of this information allows for decision module 210 to calculate uplink and/or downlink beamforming vector solutions that result in improved beamforming between communication devices. For example, decision module 210 may calculate uplink and downlink beamforming vectors that result in beamforming patterns having orthogonal polarizations and/or main beams of an uplink/downlink pair directed towards one another. The communication performance metrics may include individual metrics corresponding to antennas 208.1-208.M, or may include an aggregation of metrics once processed via decision module 210 depending on the type of MIMO system in which MIMO beamforming system 200 is implemented.

In an exemplary embodiment of the present disclosure, decision module 210 is configured to identify a physical location of each of antennas 208.1-208.M. Decision module 210 may include memory that stores such information or decision module 210 may derive this information using a port mapping and/or addressing scheme. Decision module 210 may incorporate antenna location information into the calculation of uplink and downlink beamforming vectors. In this way, decision module 210 may generate predetermined uplink beamforming vectors that account for the location of antennas used to receive downlink transmissions. Decision module 210 may access a table from memory of correlated uplink and downlink beamforming patterns that have been verified to provide desirable communication performance.

For example, when a downlink beamforming vector is applied to signals received via a first subset of antennas 201-1.208.M to form a downlink beamforming pattern for receiving downlink transmissions, a respective correlated uplink beamforming vector may be applied to signals transmitted via a second subset of antennas 208.1-208.M to form an uplink beamforming pattern for sending uplink transmissions. This uplink beamforming pattern may be known to have a shape that includes nulls in the direction of the one or more antennas in the first subset. Since MIMO beamforming system 200 may include a large number of antennas 208.1-208.M, the uplink and/or downlink beamforming patterns may be formed with many degrees of freedom. In this way, a beamforming matrix may be calculated such that an uplink/downlink beamforming pattern pair, such as beamforming patterns 104/112 and/or 110/114 do not interfere or leak energy into one another.

The channel information may include one more sources of interference and/or a location of such interference. Decision module 210 is configured to identify a direction of the interference in various ways. Decision module 210 may utilize calculated channel information to determine one or more unique identifiers of the sources of interference. In an exemplary embodiment of the present disclosure, decision module 210 is configured to access a list of base station identifiers and their corresponding physical locations. In accordance with such an embodiment, decision module 210 may identify a particular base station as a source of interference and correlate the base station's identifier with locations in the list to determine the base station's location. If the base station identifier is different from the base station that is communicating with the device in which MIMO beamforming system 200 is implemented, such as communication devices 101 or 106, for example, then decision module 210 may adjust the downlink beamforming vector to create one or more nulls in the direction of the identified interfering base station.

In an exemplary embodiment of the present disclosure, decision module 210 measures interference by analyzing one or more of the calculated communication performance metrics. Such an embodiment may be implemented, for example, when decision module 210 does not have a priori information of sources of interference. Interference may be measured, for example, by determining the signal-to-noise plus interference ratio (SINR) received at each of antennas 208.1-208.M used to form the downlink beamforming pattern. Since decision module 210 may identify physical locations of antennas 208-1-208.M, the SINR information may be used by decision module 210 to adjust the downlink beamforming vector such that antennas exposed to the highest interference are given less weight than antennas experiencing lower interference. In other words, the downlink beamforming pattern is adjusted such that nulls are created in the direction of the interference. By continuously monitoring the communication performance metrics and adjusting the uplink and/or downlink beamforming patterns, full-duplex communications between devices may be improved.

In accordance with an exemplary embodiment of the present disclosure, decision module 210 compares the communication performance metrics to a threshold value when deciding to adjust the uplink and/or downlink beamforming vectors. Depending on the type of communication performance metrics, thresholds may be indicative of acceptable maximum and/or minimum values. For example, if the communication performance metric is SINR, then decision module 210 may adjust the uplink and/or downlink beamforming vectors when the SINR received at any of antennas 208.1-208.M falls below a threshold SINR value.

To provide another example, if the communication performance metrics are indicative of a source of interference, then the threshold value may represent an RSSI value associated with the identified interference. Decision module 210 may adjust the uplink and/or downlink beamforming vector when the RSSI associated with the interference source increases above a threshold value.

To provide a further example, if the communication performance metric is a self-interference coupling factor, then the threshold value may represent a value associated with this self-interference coupling factor. Decision module 210 may adjust the uplink and/or downlink beamforming vector when the self-interference coupling factor increases above a threshold coupling value.

In an exemplary embodiment of the present disclosure, MIMO beamforming system 200 communicates with another communication device to exchange locally measured communication performance metrics with one another. This information may be calculated channel information, for example. Decision module 210 may utilize this information to set additional thresholds and/or to provide a feedback mechanism. For example, decision module 210 may receive RSSI values from a communication device receiving uplink transmissions from MIMO beamforming system 200. This RSSI value is indicative of the strength of uplink transmissions actually received at this communication device transmitted from MIMO beamforming system 200. In such an embodiment, a power threshold value may be set such that decision module 210 adjusts the uplink and/or downlink beamforming vectors when the uplink RSSI value falls below this power threshold value.

Similarly, decision module 210 may utilize a power threshold value associated with the RSSI value corresponding to the power received via the downlink beamforming pattern. This RSSI value is indicative of the strength of downlink transmissions received at MIMO beamforming system 200. In such an embodiment, a power threshold value may be set such that decision module 210 adjusts the uplink and/or downlink beamforming vectors when the downlink RSSI value falls below this power threshold value.

In accordance with an exemplary embodiment of the present disclosure, decision module 210 utilizes a cost function to improve communication performance. By maximizing the cost function, communication performance is improved. This cost function may have factors associated with combinations of uplink and/or downlink beamforming patterns that provide for maximum power received at each of the communicating devices, such as communication devices 101 and 106, for example. The cost function may include an additional constraint, such as the self-interference coupling factor, for example. By solving for the beamforming vectors associated with maximum power received at each communication device while simultaneously minimizing the self-interference coupling ratio, communication performance is improved.

In accordance with an embodiment whereby MIMO beamforming system 200 is implemented within communication device 101 and/or 106, the downlink channel between communication device 101 and communication device 106 may be represented as a channel matrix H1 having dimensions M×N. The uplink channel between communication device 106 and communication device 101 may be represented as a channel matrix H2 having dimensions N×M. N corresponds to the number of transmit/receive antennas at communication device 106, and M corresponds to the number of transmit/receive antennas at communication device 101.

In accordance with an embodiment of the present disclosure, decision module 210 is configured to maximize a cost function represented by equation 1 for each data stream transmitted or received from MIMO beamforming system 200.

$$[\hat{w}_{rx} \; \hat{w}_{tx}] = \underset{\hat{w}_{rx}, \hat{w}_{tx}}{\mathrm{argmax}}\, f\left(\|H_1\hat{w}_{rx}\|^2, \|H_2\hat{w}_{tx}\|^2, \frac{1}{|\hat{w}_{rx} G \hat{w}_{tx}|^2}\right) \quad \text{Eqn. 1}$$

Equation 1 is a cost function that maximizes three separate terms to solve for the uplink and downlink beamforming vectors for each respective data stream transmitted or received from communication devices in which MIMO beamforming system 200 is implemented, such as communication device 101 and/or 106, for example.

The first term $\|H_1 \hat{w}_{rx}\|^2$ corresponds to a norm operation performed between matrix H1 and downlink beamforming vector $\hat{w}_{rx}$. The norm operation is performed by summing and squaring amplitude and phase distributions which constitute the downlink beamforming vector with the H1 channel matrix. This downlink beamforming vector results in a desired channel path direction that is equivalent to capturing the downlink signal energy in the shape and direction represented by the downlink beamforming pattern for a particular received data stream. This results in a combination of signals received from the M antennas in an optimal way. Solving this term for a maximum scalar value corresponds to a downlink beamforming vector solution having amplitude and phase weights such that SINR is maximized at a communication device, such as communication device 106, for example.

The second term $\|H_2 \hat{w}_{tx}\|^2$ corresponds to a norm operation performed between matrix H2 and uplink beamforming vector $\hat{w}_{tx}$. The norm operation is performed by summing and squaring amplitude and phase distributions which constitute the uplink beamforming vector with the H2 channel matrix. Solving this term for a maximum scalar value corresponds to a downlink beamforming vector having amplitude and phase weights such that maximum signal energy is received at a communication device, such as communication device 101, for example, for a particular transmitted data stream.

The third term $$\frac{1}{|w_{rx} G w_{tx}|^2}$$

corresponds to self-interference coupling at a communication device, such as communication device 106, for example. The cost function seeks to minimize the denominator in this term, thereby maximizing the overall term scalar value. Since the uplink and downlink beamforming vectors provide weights as signals are transmitted and received via the uplink and downlink channels, different amounts of self-interference are received among the M antenna elements. Therefore, the self-interference coupling channel between the uplink and downlink beamforming patterns at communication device 106 may be represented as a channel matrix G having dimensions M×M. The norm operation is performed by summing and squaring amplitude and phase distributions which constitute the uplink and downlink beamforming vectors with the G channel matrix. Solving this term for a maximum scalar value corresponds to uplink and downlink beamforming vector solutions having amplitude and phase weights such that self-interference coupling at communication device 106 is minimized for a particular transmitted data stream.

Decision module 210 may be implemented with any number of modules that may have any number of functions. For example, decision module 210 may have any number of beamforming/clustering modules that calculate the beamforming matrix from the self-interference coupling factor and/or communication performance metrics. Although illustrated in FIG. 2 as a single block, decision module 210 may be implemented with several decision modules that each control a different portion of the beamforming matrix. For example, decision module 210 may include a transmit and a receive decision module that each calculates a part of the beamforming matrix associated with the uplink and downlink beamforming patterns.

In accordance with such an embodiment, beamforming module 204 may include separate beamforming modules. For example, as previously discussed, beamforming module 204 may include a transmit and receive beamforming module. Each of the beamforming modules may communicate with modules that are implemented by decision module 210. In this way, portions of beamforming module 204 and decision module 210 may work together to calculate any portion of the beamforming matrix to provide further beamforming pattern flexibility.

Figure 3:
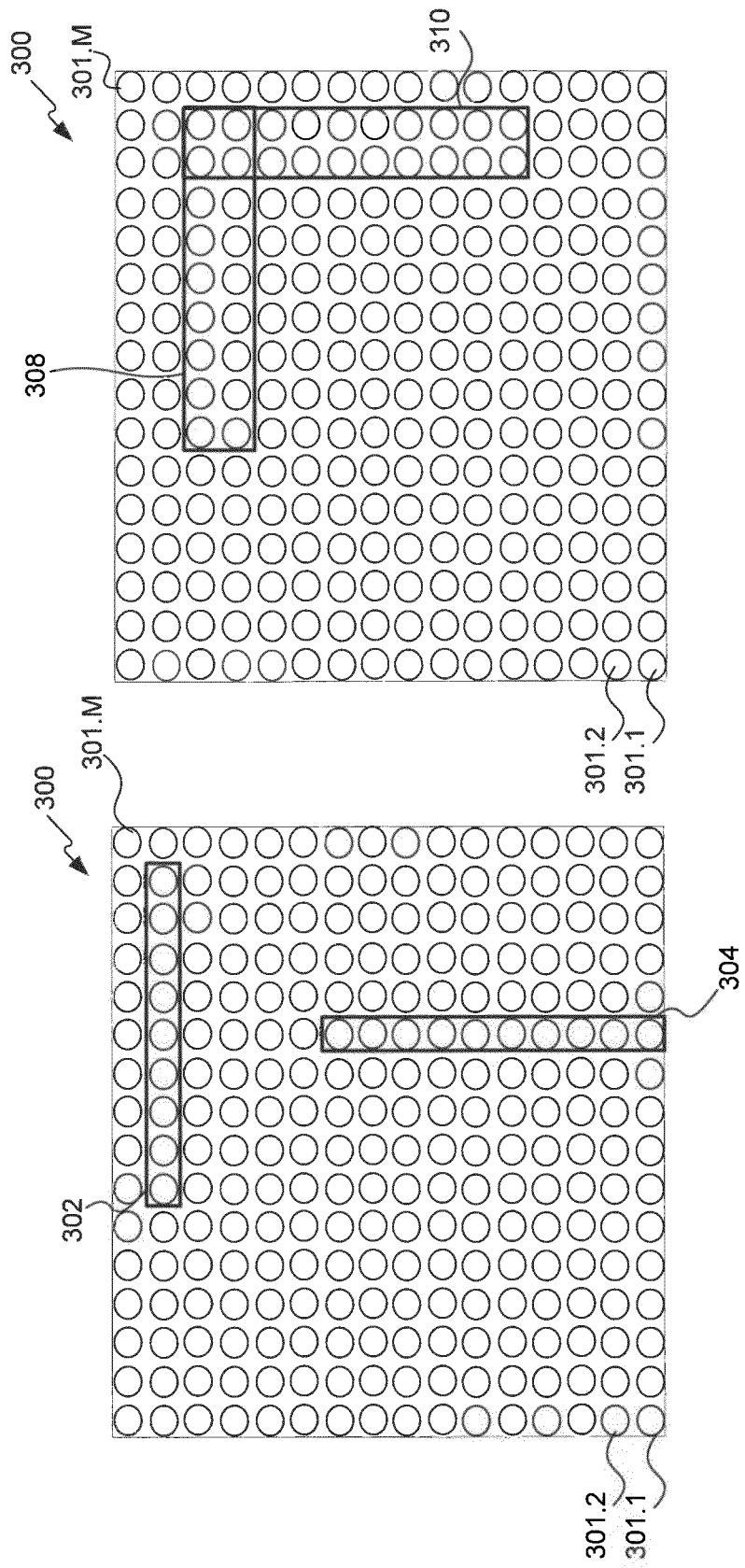
FIG. 3A illustrates a MIMO beamforming system utilizing separate antenna subsets for uplink and downlink communications according to an exemplary embodiment of the disclosure.
FIG. 3B illustrates a MIMO beamforming system utilizing shared antenna subsets for uplink and downlink communications according to an exemplary embodiment of the disclosure.

FIG. 3A illustrates a MIMO beamforming system 300 utilizing separate antenna subsets for uplink and downlink communications in accordance with an exemplary embodiment of the disclosure. Antenna array 301 includes individual antenna elements 301.1-301.M, some of which constitute first and second antenna subsets 302 and 304 for a selected antenna clustering. Antenna array 301 may be an exemplary embodiment of MIMO antennas 102 and/or 108. Individual antenna elements 301.1-301.M may be implemented in an exemplary embodiment of MIMO beamforming system 200. In such an embodiment, antenna elements 301.1-301.M are exemplary embodiments of antennas 208.1-208.M.

As previously discussed with reference to FIG. 2, antenna subsets formed by beamforming module 204 may include separate antenna elements for uplink and downlink transmissions. FIG. 3A illustrates an exemplary embodiment whereby first and second antenna subsets 302 and 304 are separate and share no common antenna from antenna elements 301.1-301.M. Either of first or second antenna subsets 302 and 304 may be used for uplink or downlink communications. In an exemplary embodiment of the present disclosure, first and second antenna subsets 302 and 304 provide respective uplink and downlink beamforming patterns having orthogonal polarizations to further reduce self-interference coupling.

FIG. 3B illustrates an embodiment whereby first and second antenna subsets 308 and 310 of antenna array 301 for a selected antenna, clustering, share common antenna elements from antennas 301.1-301.M. Either of first or second antenna subsets 308 and 310 may be used for uplink or downlink communications. In an exemplary embodiment of the present disclosure, first and second antenna subsets 308 and 310 generate respective uplink and downlink beamforming patterns having orthogonal polarizations to further reduce self-interference coupling.

Although antenna subsets 308 and 310 are illustrated in FIG. 3B as sharing 4 antenna elements, first and second antenna subsets 308 and 310 may share any number of antenna elements 301.1-301.M, including all antenna elements. In an embodiment in which all antenna elements are shared (i.e., the same antenna elements are used for uplink and downlink transmissions) the self-interference coupling factor may be a maximized in a full-duplex communications mode. However, since decision module 210 may still maximize other terms in the cost function to solve for appropriate uplink and downlink beamforming vectors, full-duplex communications may be implemented in such a case.

Figure 4:
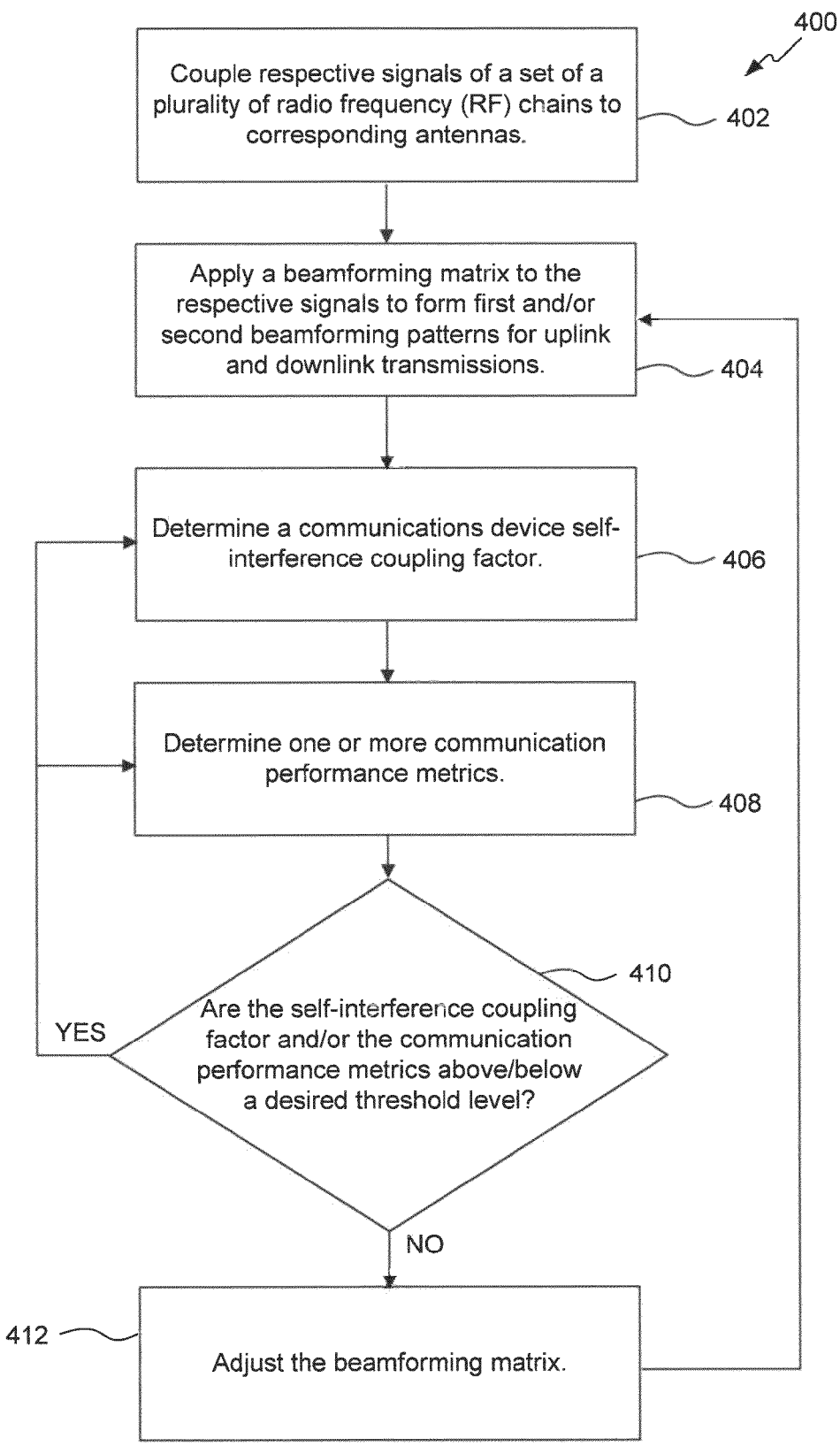
FIG. 4 illustrates a process according to an exemplary embodiment of the disclosure.

FIG. 4 illustrates a process 400 according to an exemplary embodiment of the disclosure. The disclosure is not limited to this operational description. Rather, it will be apparent to persons skilled in the relevant art(s) from the teachings herein that other operational control flows are within the scope and spirit of the present disclosure. The following discussion describes the steps in FIG. 4. Process 400 may describe an exemplary embodiment of the steps implemented within the previously described and illustrated by MIMO beamforming system 200.

At step 402, process 400 begins by coupling respective signals of a set of a plurality of RF chains to one or more corresponding antennas. The coupling to the corresponding antennas forms a first and a second subset of antennas.

Step 404 includes applying a beamforming matrix to the respective signals to form first and/or second beamforming patterns for uplink and downlink transmissions. As a result, the first and second subsets of antennas form uplink and downlink beamforming patterns, respectively. As previously discussed, the beamforming matrix may be calculated by a decision module, such as decision module 210, for example, and then applied by a beamforming module, such as beamforming module 204, for example.

At step 406, process 400 includes determining a self-interference coupling factor. This step may be performed by a decision module, such as decision module 210, for example, which may calculate the self-interference coupling factor from pilot signals received via antennas used to receive downlink transmissions.

At step 408, process 400 includes determining one or more communication performance metrics. In an exemplary embodiment of the present disclosure, step 408 is optional. In other words, in such an exemplary embodiment, process 400 may only determine the self-interference coupling factor and no other communication performance metrics.

At step 410, process 400 includes comparing the self-coupling factor and/or one or more communication performance metrics to any number of desired, threshold levels. If the desired threshold levels are not exceeded, then process 400 proceeds to steps 406 and/or 408, whereby process 400 resumes monitoring and determining the self-interference coupling factor and/or the communication performance metrics.

At step 412, process 400 includes adjusting the beamforming matrix to adjust the self-interference coupling factor and/or the one or more communication performance metrics such that they no longer exceed their respective threshold values. Once the adjusted beamforming matrix is calculated, process 400 returns to step 404, where these adjusted beamforming vectors are applied to the respective signals. Process 400 may include repeatedly performing steps 404 through 412 any number of times to iteratively adjust the beamforming patterns to improve full-duplex communications.

The disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

It will be apparent to those skilled in the relevant art(s) that various changes in form and detail may be made therein without departing from the spirit and scope of the disclosure. Thus the disclosure should not be limited by any of the above-described exemplary embodiments, but should be defined only in accordance with the following claims and their equivalents.

Embodiments of the disclosure may be implemented in hardware, firmware, software, or any combination thereof. Embodiments of the disclosure may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include non-transitory machine-readable mediums such as read only memory (ROM); random access memory (RAM); magnetic disk storage media; optical storage media; flash memory devices; and others. As another example, the machine-readable medium may include transitory machine-readable medium such as electrical, optical, acoustical, or other forms of propagated signals (e.g., carrier waves, infrared signals, digital signals, etc.). Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

What is claimed is:

1. A communication device having a plurality of antennas, comprising:
    a beamforming module configured to apply a beamforming matrix to a plurality of signals and to couple the plurality of signals to corresponding radio frequency (RF) chains from among a plurality of RF chains;
    a coupling module configured to couple the plurality of signals from the corresponding RF chains to corresponding antennas from among the plurality of antennas of the communication device; and
    a decision module configured to control the beamforming module to apply the beamforming matrix to the plurality of signals to form first and second beamforming patterns,
    wherein the first beamforming pattern is configured to transmit a first signal to a second communication device using a first subset of antennas from among the plurality of antennas of the communication device,
    wherein the second beamforming pattern is configured to receive a second signal from the second communication device using a second subset of antennas from among the plurality of antennas of the communication device, and
    wherein the decision module is further configured to calculate the beamforming matrix to shape the first beamforming pattern to direct a null toward the second subset of antennas.

2. The communication device of claim 1, wherein the plurality of RF chains is configured to facilitate full-duplex communications between the communication device and the second communication device, and
    wherein the full-duplex communications occur within a Long-Term Evolution (LTE) frequency band.

3. The communication device of claim 1, wherein the coupling module is further configured to couple a transmit port and a receive port of the plurality of RF chains to a common respective antenna from among the first subset of antennas and the second subset of antennas.

4. The communication device of claim 1, wherein the first and second beamforming patterns are generated from the first and second subsets of antennas, respectively, and
    wherein the first and second subsets of antennas are separate from one another.

5. The communication device of claim 1, wherein the first and second beamforming patterns are generated from the first and second subsets of antennas, respectively, and
    wherein the first and second subsets of antennas share a common antenna.

6. The communication device of claim 1, wherein the first and second beamforming patterns are generated from the first and second subsets of antennas, respectively, and wherein the first and second subsets of antennas share identical antennas from among the plurality of antennas of the communication device.

7. The communication device of claim 1, wherein the first and second beamforming patterns are generated from the first and second subsets of antennas, respectively,
    wherein the first and second subsets of antennas communicate respectively with third and fourth, subsets of antennas from among a second plurality of antennas of the second communication device, and
    wherein the third and fourth subsets of antennas have substantially the same polarizations as the first and second subsets of antennas, respectively.

8. The communication device of claim 1, wherein the decision module is further configured to adjust the beamforming matrix based upon a comparison of a communication signal performance metric for the first signal and a threshold value.

9. The communication device of claim 8, wherein the communication performance metric comprises:
    a signal-to-noise-plus-interference ratio (SINR), and
    wherein the decision module is configured to adjust the beamforming matrix when the SNR is less than the threshold value.

10. The communication device of claim 8, wherein the communication performance metric is indicative of a source of interference, and
    wherein the decision module is configured to adjust the beamforming matrix when a received signal strength indication (RSSI) associated with the source of interference is greater than the threshold value.

11. The communication device of claim 8, wherein the communication performance metric comprises:
    a self-interference coupling factor, and
    wherein the decision module is configured to adjust the beamforming matrix when the self-interference coupling factor is greater than the threshold value.

12. The communication device of claim 8, wherein the decision module is configured to receive the communication signal performance metric from the second communication device.

13. The communication device of claim 12, wherein the communication performance metric comprises:
    a signal strength of the first signal as received by the second communication device, and
    wherein the decision module is configured to adjust the beamforming matrix when the signal strength is less than the threshold value.

14. In a communication device having a plurality of antennas, a method of selecting antennas from among the plurality of antennas of the communication device within a multiple-input multiple-output (MIMO) system for communications with a base station, the method comprising:

coupling respective signals of a set of a plurality of radio frequency (RF) chains to corresponding first and second subsets of antennas from among the plurality of antennas of the communication device;

applying a beamforming matrix to the respective signals to generate a first beamforming pattern for uplink transmissions to the base station via the first subset of antennas and a second beamforming pattern for downlink transmissions from the base station via the second subset of antennas, the beamforming matrix shaping the first beamforming pattern to direct a null toward the second subset of antennas; and adjusting the beamforming matrix based upon a comparison of a communication signal performance metric for the uplink transmissions or the downlink transmissions and a threshold value.

15. The method of claim 14, wherein the applying the beamforming matrix facilitates the uplink and downlink transmissions in full-duplex mode.

16. The method of claim 14, further comprising:
adjusting the beamforming matrix to increase signal power received at the base station via the uplink transmissions when the communication signal performance metric for the uplink transmissions falls below the threshold value.

17. The method of claim 14, further comprising:
adjusting the beamforming matrix to increase signal power received at the communication device via the downlink transmissions when the communication signal performance metric for the downlink transmission falls below the threshold value.

18. The method of claim 14, further comprising:
adjusting the beamforming matrix to reduce a self-interference coupling factor when the communication signal performance metric for the uplink transmissions or the downlink transmissions is above the threshold value.

19. The method of claim 14, further comprising:
adjusting the beamforming matrix to reduce interference received from other base stations when the communication signal performance metric for the uplink transmissions or the downlink transmissions is above the threshold value.

20. A communication device having a plurality of antennas, comprising:
a beamforming module configured to apply a beamforming matrix to a plurality of signals and to couple the plurality of signals to corresponding radio frequency (RF) chains from among a plurality of RF chains;
a coupling module configured to couple the plurality of signals from the corresponding RF chains to corresponding antennas from among the plurality of antennas of the communication device; and
a decision module configured to control the beamforming module to apply the beamforming matrix to the plurality of signals to form a first beamforming pattern for uplink communications using a first subset of antennas from among the plurality of antennas of the communication device and a second beamforming pattern for downlink communications using a second subset of antennas from among the plurality of antennas of the communication device, respectively, the first beamforming pattern having a main beam directed towards a second communication device and a null directed towards the second subset of antennas.

21. The communication device of claim 20, wherein the uplink communications comprise:
pilot signals transmitted to the second communication device via the first beamforming pattern,
wherein the downlink communications comprise:
pilot signals received from the second communication device via the second beamforming pattern, and
wherein the decision module is further configured to determine a self-interference coupling factor based on the received pilot signals and to determine the beamforming matrix based on the self-interference coupling factor.

22. The communication device of claim 21, wherein the decision module is further configured to adjust the beamforming matrix to reduce the self-interference coupling factor.

23. The communication device of claim 20, wherein the decision module is further configured to adjust the beamforming matrix such that the first beamforming pattern results in a gain that increases signal power received at the second communication device.

24. The communication device of claim 20, wherein the decision module is further configured to adjust the beamforming matrix such that the second beamforming pattern results in a gain that increases signal power received from the second communication device.

25. The communication device of claim 20, wherein the first subset of antennas and the second subset of antennas share a common antenna.

26. The communication device of claim 20, wherein the plurality of RF chains is configured to facilitate full-duplex communications between the communication device and the second communication device, and
wherein the full-duplex communications occur within a Long-Term Evolution (LTE) frequency band.

* * * * *